United States Patent
Kato et al.

(10) Patent No.: US 9,896,252 B2
(45) Date of Patent: Feb. 20, 2018

(54) CABLE TIE

(71) Applicant: DAIWA KASEI KOGYO KABUSHIKI KAISHA, Okazaki-shi, Aichi-ken (JP)

(72) Inventors: Makoto Kato, Toyota (JP); Katsuya Hirakawa, Toyokawa (JP)

(73) Assignee: DAIWA KASEI KOGYO KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/240,889

(22) Filed: Aug. 18, 2016

(65) Prior Publication Data
US 2017/0057715 A1 Mar. 2, 2017

(30) Foreign Application Priority Data
Aug. 25, 2015 (JP) ................. 2015-165925

(51) Int. Cl.
*B65D 63/10* (2006.01)
*B60R 16/02* (2006.01)
*F16L 3/137* (2006.01)
*F16L 3/233* (2006.01)

(52) U.S. Cl.
CPC ...... B65D 63/1072 (2013.01); B60R 16/0215 (2013.01); B65D 2563/108 (2013.01); F16L 3/137 (2013.01); F16L 3/2334 (2013.01); Y10T 24/1498 (2015.01)

(58) Field of Classification Search
CPC .. B65D 63/1072; Y10T 24/1498; F16L 3/137; F16L 3/2334
See application file for complete search history.

(56) References Cited

U.S. PATENT DOCUMENTS

| | | |
|---|---|---|
| 2006/0162130 A1 | 7/2006 | Cook |
| 2010/0281661 A1* | 11/2010 | Harada ............ A42B 1/22 24/593.11 |
| 2011/0302746 A1 | 12/2011 | Sano |

FOREIGN PATENT DOCUMENTS

| | | |
|---|---|---|
| DE | 21 28 086 A1 | 12/1972 |
| DE | 32 32 972 A1 | 8/1984 |
| EP | 2 397 420 A1 | 12/2011 |

(Continued)

OTHER PUBLICATIONS

Extended European Search Report for EP application EP16181209.4, dated Jan. 27, 2017, 8 pages.*

*Primary Examiner* — Robert J Sandy
(74) *Attorney, Agent, or Firm* — Christensen, Fonder, Dardi & Herbert PLLC

(57) ABSTRACT

A cable tie having a desired length of flexible belt and a buckle connected to one longitudinal end of the belt may include rack teeth that are formed in one surface of the belt and are arranged in a longitudinal direction of the belt, an engagement strip that is positioned in a through hole of the buckle and is configured to be deformed about its proximal end connected to an inner wall of the buckle, and an engagement claw that is formed in the engagement strip. The engagement strip is configured to be deformed due to contact with the belt inserted into the through hole of the buckle, so that a crossing angle is formed between the engagement surface of the engagement claw and the tooth surface of one of the rack teeth in a fastened condition in which the belt is inserted into the through hole of the buckle and is tightened.

4 Claims, 6 Drawing Sheets

(56) References Cited

FOREIGN PATENT DOCUMENTS

| | | | | |
|---|---|---|---|---|
| EP | 3135975 A1 * | 3/2017 | ......... | B65D 63/1072 |
| JP | 5478374 B2 | 2/2014 | | |

* cited by examiner

CABLE TIE

BACKGROUND OF THE INVENTION

Field of the Invention

The present invention relates to a cable tie (clamping band) for clamping or binding a clamped article (e.g., a wiring harness that is used for vehicle wiring).

Description of Related Art

A known cable tie is taught by, for example, Japanese Patent No. 5478374. The known cable tie is a one piece plastic molded article that is integrally formed using a molding die. The cable tie includes a desired length of flexible belt (holding member) that is configured to hold a clamped article (e.g., a wiring harness), and a buckle integrally connected to one longitudinal end of the belt. The belt has a plurality of teeth or rack teeth that are formed in a surface thereof and are arranged in series in a longitudinal direction. Conversely, the buckle has a through hole into which the belt is inserted. Further, the buckle has an engagement strip (buckle tongue) formed in the through hole. The engagement strip has a plurality of engagement claws formed in a distal end thereof and is configured to bend or flex about a proximal end thereof. The engagement claws are arranged and constructed to engage the rack teeth formed in the belt when the belt is inserted into the through hole of the buckle.

In order to clamp the clamped article, the belt is wrapped around the clamped article. Thereafter, a free end (the other longitudinal end) of the belt wrapped around the clamped article is inserted into the through hole of the buckle and is then drawn from the buckle. Subsequently, the belt is tightened by pulling the free end thereof. At this time, the engagement claws formed in the engagement strip of the buckle can automatically engage the rack teeth of the belt, so that the belt can be locked or secured to the buckle. Thus, the clamped article can be clamped by the cable tie.

Generally, in a fastened condition in which the belt wrapped around the clamped article and inserted into the through hole of the buckle is fastened, a belt extraction load may sometimes be applied to the belt in a belt extraction direction opposite to a belt insertion direction. However, the belt extraction load can be received by engagement surfaces of the engagement claws via tooth surfaces of the rack teeth of the belt, so that the engagement claws may be prevented from being disengaged from the rack teeth of the belt. Thus, the belt may be prevented from being unexpectedly withdrawn or extracted from the through hole of the buckle. Further, when the belt extraction load is applied to the belt, the engagement claws of the engagement strip can be pulled in the belt extraction direction by the rack teeth of the belt while the engagement strip can be flexed toward the belt. As a result, the engagement surfaces of the engagement claws can be inclined with respect to the tooth surfaces of the rack teeth of the belt in the belt extraction direction such that the belt extraction load can be deflected from the belt extraction direction. Therefore, when a large belt extraction load greater than a predetermined value is applied to the belt in the fastened condition, the engagement surfaces of the engagement claws may be excessively inclined with respect to the tooth surfaces of the rack teeth of the belt. As a result, the large belt extraction load cannot be effectively absorbed or received by the engagement claws, so that the engagement claws may be disengaged from the rack teeth of the belt. This means that the belt may be unexpectedly withdrawn or extracted from the through hole of the buckle.

Therefore, in order to prevent the engagement claws from being disengaged from the rack teeth of the belt (i.e., in order to prevent the belt from being withdrawn or extracted from the through hole of the buckle) even when the large belt extraction load is applied to the belt in the fastened condition, the engagement surfaces of the engagement claws (and/or the tooth surfaces of the rack teeth) may be previously angled in the belt insertion direction (i.e., a direction opposite to the belt extraction direction) so as to withstand the large belt extraction load applied to the belt. According to the structure, when the large belt extraction load is applied to the belt, the engagement surfaces of the engagement claws can be prevented from being excessively inclined with respect to the tooth surfaces of the rack teeth of the belt. Therefore, the engagement claws can be effectively prevented from being disengaged from the rack teeth of the belt even when the large belt extraction load is applied to the belt. As a result, the belt may be prevented from being unexpectedly withdrawn or extracted from the through hole of the buckle.

However, in order to angle the engagement surfaces of the engagement claws (and/or the tooth surfaces of the rack teeth) in the belt insertion direction, the molding die used to manufacture the cable tie must be specially designed or redesigned with a draft angle and/or an undercut shape. Thus, there is a need in the art for improved cable ties.

SUMMARY OF THE INVENTION

For example, in one embodiment of the present teachings, a cable tie having a desired length of flexible belt and a buckle connected to one longitudinal end of the belt and configured to clamp a clamped article by inserting the other longitudinal end of the belt into a through hole of the buckle and tightening the belt in loop shape may be provided. The cable tie may include rack teeth that are formed in one surface of the belt and are arranged in series in a longitudinal direction of the belt, an engagement strip that is positioned in the through hole of the buckle and is configured to be deformed about its proximal end connected to an inner wall of the buckle, and an engagement claw that is formed in the engagement strip in order to engage the rack teeth of the belt inserted into the through hole of the buckle. The engagement claw has an engagement surface that faces a tooth surface of one of the rack teeth in a condition in which the engagement claw engages one of the rack teeth upon insertion of the belt into the through hole of the buckle. The engagement strip is configured to be deformed due to contact with the belt inserted into the through hole of the buckle, so that a crossing angle is formed between the engagement surface of the engagement claw and the tooth surface of one of the rack teeth in a fastened condition in which the belt is inserted into the through hole of the buckle and is tightened.

According to the cable tie of the present embodiment, the engagement strip positioned in the through hole of the buckle may be deformed due to contact with the belt inserted into the through hole of the buckle. As a result, the crossing angle may be formed between the engagement surface of the engagement claw and the tooth surface of one of the rack teeth in the fastened condition of the belt. Therefore, when a substantial belt extraction load is applied to the belt in the fastened condition of the belt (a clamped condition of the clamped article), the crossing angle can be reduced to zero, so that the engagement surface of the engagement claw may fully contact the tooth surface of one of the rack teeth to form a surface contact therebetween. As a result, the substantial belt extraction load can be effectively received or absorbed by the engagement surface of the engagement claw. Thus, the cable tie may have an excellent resistive power against the substantial belt extraction load. In other words, the cable tie may have an increased clamping performance.

Further, the crossing angle may be defined between the engagement surface of the engagement claw and the tooth surface of one of the rack teeth due to deformation of the engagement strip in the fastened condition of the belt. Therefore, there is no need to change the shape of the engagement surfaces of the engagement claws formed in the engagement strip as well as the shape of the tooth surfaces of the rack teeth. As a result, there is no need to specially design a molding die used to manufacture the cable tie.

Additional objects, features and advantages of the present invention will be readily understood after reading the following detailed description together with the accompanying drawings and the claims.

DETAILED DESCRIPTION OF THE INVENTION

A detailed representative embodiment of the present invention will be described with reference to FIGS. 1 to 7.

Figure 1:
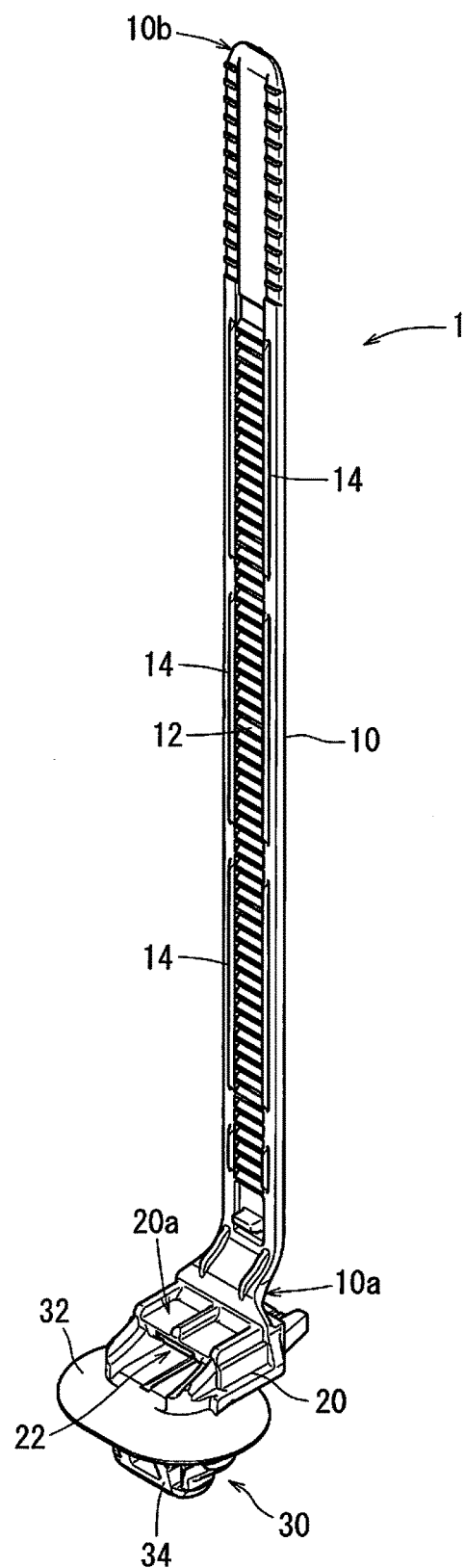
FIG. 1 is a perspective view of a cable tie according to a representative embodiment of the present invention.
Figure 2:
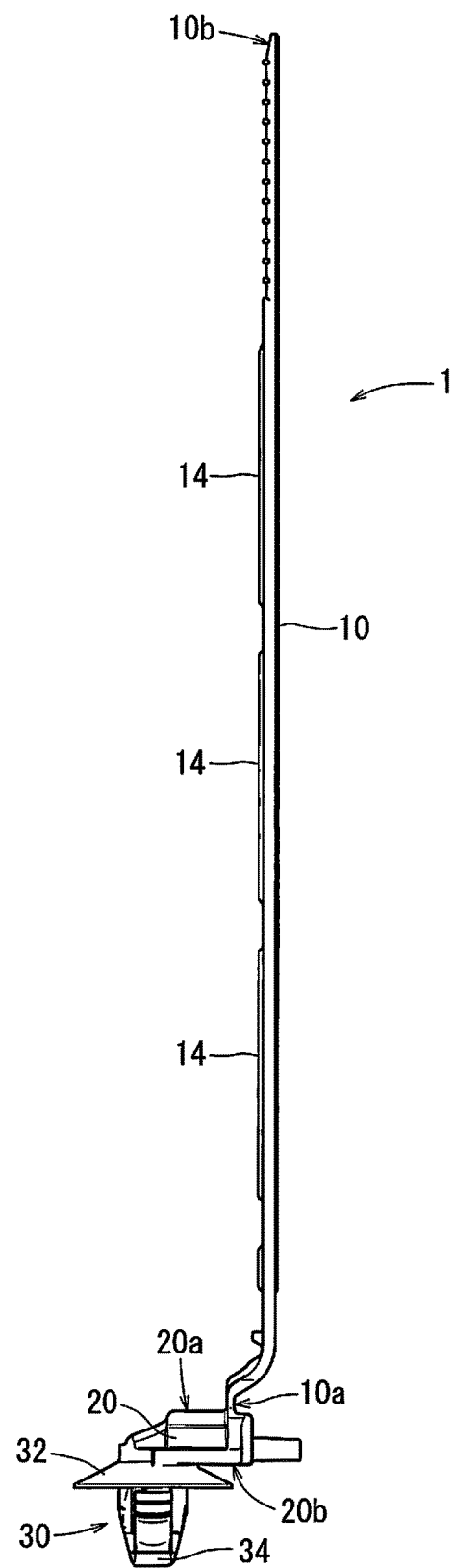
FIG. 2 is a plan view of the cable tie.

A representative cable tie (clamping band) 1 may be a one piece plastic molded article that is integrally formed using a molding die. As shown in FIGS. 1 and 2, the cable tie 1 may include a desired length of flexible belt (holding member) 10, a buckle 20 and an engagement leg or anchor 30. The belt 10 may be configured to hold a wiring harness W (a clamped article). The buckle 20 may be integrally connected to the belt 10. In particular, one longitudinal end (proximal end) 10a of the belt 10 may be integrally connected to an upper surface 20a of the buckle 20. The anchor 30 may be integrally connected to the buckle 20. In particular, the anchor 30 may be integrally connected to a lower surface 20b of the buckle 20, so as to be projected downward therefrom.

Figure 3:
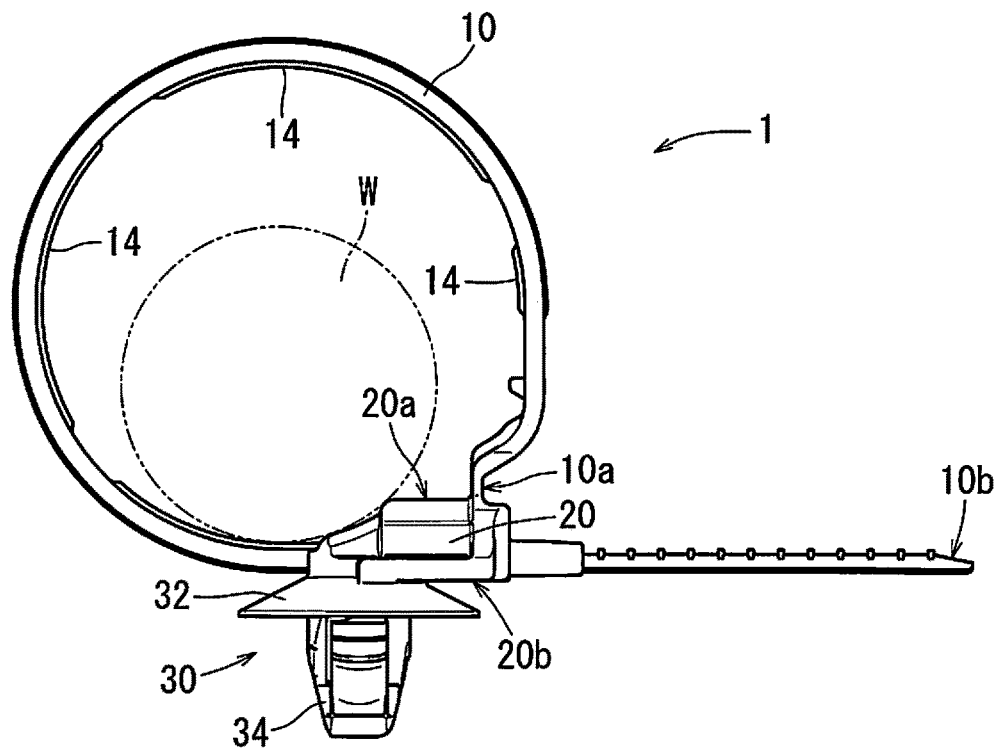
FIG. 3 is a plan view of the cable tie, in which a belt of the cable tie is wrapped around a clamped article and is inserted into a through hole of a buckle of the cable tie.
Figure 4:
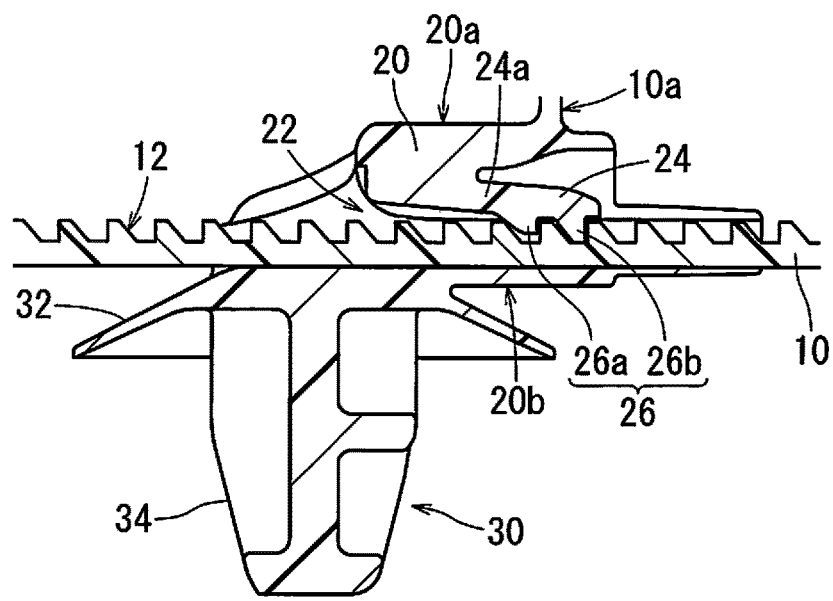
FIG. 4 is a partially enlarged cross-sectional view of the cable tie in a condition in which the belt is tightened.

As shown in FIGS. 1 and 4, the buckle 20 may have a through hole 22 into which the other longitudinal end (distal or free end) 10b of the belt 10 may be inserted and introduced. In order to clamp the wiring harness W, the belt 10 may be wrapped around an outer circumferential surface of the wiring harness W. Thereafter, the other longitudinal end 10b of the belt 10 may be inserted into the through hole 22 of the buckle 20 via an inlet and may then be drawn from the through hole 22 via an outlet. As a result, the belt 10 may be looped around the outer circumferential surface of the wiring harness W (FIG. 3). Subsequently, the belt 10 looped around the wiring harness W may be tightened by pulling the other longitudinal end 10b thereof. Thus, the outer circumferential surface of the wiring harness W may be clamped by the belt 10.

Figure 6:
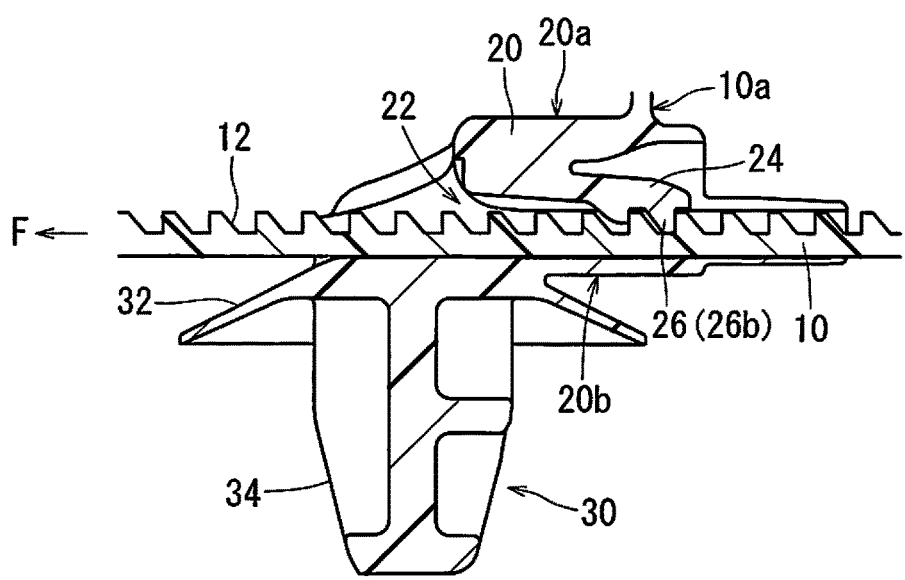
FIG. 6 is a partially enlarged cross-sectional view of the cable tie similar to FIG. 4 in a condition in which a belt extraction load is applied to the belt.

As shown in FIGS. 1, 4 and 6, the belt 10 may have a plurality of teeth or rack teeth 12 that are formed in one surface (an upper surface in FIGS. 4 and 6, which surface may be referred to as an inner surface) thereof. The rack teeth 12 may be arranged in series at a constant pitch in a longitudinal direction of the belt 10. Further, as shown in FIGS. 1 and 2, the belt 10 may have a plurality of ribs 14 that are longitudinally discontinuously formed in one surface thereof. The ribs 14 may preferably be positioned on both sides of the rack teeth 12. The ribs 14 may function to partially press the outer circumferential surface of the wiring harness W clamped by the belt 10, so as to prevent the wiring harness W from being axially slid.

As shown in FIGS. 4 and 6, the buckle 20 may have an engagement strip (buckle tongue) 24 formed in the through hole 22. The engagement strip 24 may have a proximal end 24a connected to an inner wall of the buckle 20 corresponding to the upper surface 20a, so as to be bent or deformed thereabout in a vertical direction in FIGS. 4 and 6. Further, the engagement strip 24 may have a plurality of (two in this embodiment) engagement claws 26 projected into the through hole 22. The engagement claws 26 may preferably be formed in a distal end portion of the engagement strip 24. The engagement claws 26 may be arranged and constructed to engage the rack teeth 12 formed in the belt 10 when the belt 10 is inserted into the through hole 22 of the buckle 20 and is fastened.

Therefore, when the belt 10 wrapped around the wiring harness W and inserted into the through hole 22 of the buckle 20 is tightened by pulling the other longitudinal end 10b drawn from the through hole 22, the engagement claws 26 formed in the engagement strip 24 can engage any two of the rack teeth 12 formed in the belt 10, so that the belt 10 can be held in loop shape.

Further, the two engagement claws 26 formed in the engagement strip 24 may be composed of a first engagement claw 26a having a small height and a second engagement claw 26b having a large height. However, in this embodiment, the second engagement claw 26b may be described as a representative of the engagement claws 26. Therefore, the second engagement claw 26b may be hereinafter simply referred to as "the engagement claw 26."

Figure 5:
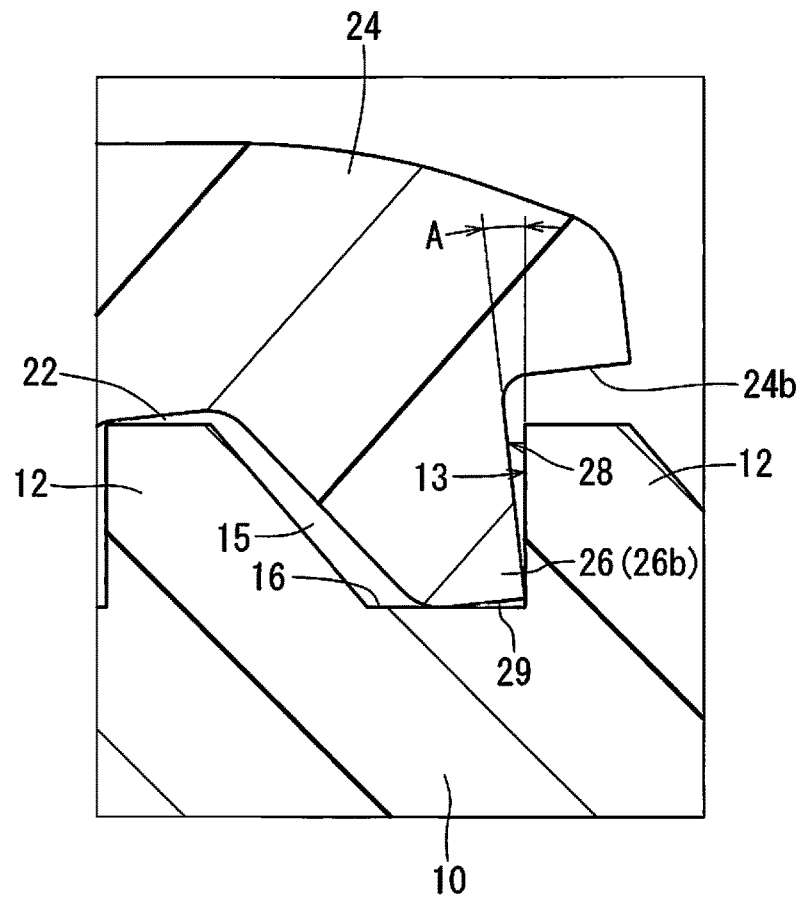
FIG. 5 is a partially enlarged view of FIG. 4.

Next, the rack teeth 12 formed in the belt 10 and the engagement claws 26 (the second engagement claw 26b) will be described in detail. First, as shown in FIG. 5, the rack teeth 12 may include tooth spaces 15 formed therebetween. Each of the rack teeth 12 may be configured such that a tooth surface 13 thereof may substantially be perpendicular to a plane corresponding to a belt insertion direction or a belt extraction direction opposite thereto. Further, each of the tooth spaces 15 may be configured such that a bottom surface 16 thereof may substantially be perpendicular to the tooth surface 13 of each of the rack teeth 12. Conversely, the engagement claw 26 formed in the engagement strip 24 may be configured such that an engagement surface 28 thereof may substantially be perpendicular to a lower surface 24b of the engagement strip 24. Further, the engagement claw 26 may preferably be configured such that a distal end surface 29 thereof may substantially be perpendicular to the engagement surface 28.

As previously described, in a fastened condition in which the belt 10 is inserted into the through hole 22 of the buckle 20 and is tightened, i.e., in a clamped condition in which the outer circumferential surface of the wiring harness W is clamped by the belt 10, the engagement claw 26 formed in the engagement strip 24 can engage any one of the rack teeth 12 formed in the belt 10 (FIG. 4). In particular, as shown in FIG. 5, the engagement claw 26 may enter one of the tooth spaces 15 of the rack teeth 12 while the engagement surface 28 of the engagement claw 26 may obliquely face the tooth surface 13 of one of the rack teeth 12.

As shown in FIGS. 4 and 5, the engagement claw 26 may preferably have a height or length greater than a height of each of the rack teeth 12 (a depth of each of the tooth spaces 15). Therefore, in the fastened condition in which the belt 10 is tightened, the distal end surface 29 of the engagement claw 26 engaging any one of the rack teeth 12 may partially contact the bottom surface 16 of one of the tooth spaces 15 of the rack teeth 12. As a result, the engagement strip 24 may be flexed or deformed in a direction in which the engagement strip 24 may be spaced from the rack teeth 12 (upward). Thus, the engagement surface 28 of the engagement claw 26 may be inclined with respect to the tooth surface 13 of one of the rack teeth 12 at a given angle in the belt extraction direction (leftward in FIG. 5). That is, in the fastened condition in which the belt 10 is tightened, a crossing angle A may be formed or defined between the engagement surface 28 of the engagement claw 26 and the tooth surface 13 of one of the rack teeth 12 (FIG. 5).

As shown in FIGS. 1 to 4 and 6, the anchor 30 may have a laterally elongated dish-shaped stabilizer 32 and a laterally widened leg portion 34 projected from a central portion of the stabilizer 32. The stabilizer 32 may be integrally connected to the lower surface 20b of the buckle 20 with the leg portion 34, so that the anchor 30 may be integrated with the lower surface 20b of the buckle 20. The leg portion 34 of the anchor 30 may be configured to be inserted into an elongated attaching hole (not shown) formed in a body panel (i.e., an attaching object) of a vehicle (not shown). Therefore, upon insertion of the leg portion 34 of the anchor 30 into the attaching hole of the body panel, the anchor 30 can be secured to the body panel while being stabilized by the stabilizer 32, so that the cable tie 1 can be connected to the body panel. Thus, the wiring harness W clamped by the belt 10 can be attached to the body panel of the vehicle.

Generally, in the fastened condition in which the belt 10 is tightened, a belt extraction load (an external force) may sometimes be applied to the belt 10 in the belt extraction direction opposite to the belt insertion direction due to vibration of the vehicle or other such causes. Upon application of the belt extraction load to the belt 10, the engagement claw 26 of the engagement strip 24 can be pulled in the belt extraction direction by one of the rack teeth 12 of the belt 10, so that the engagement strip 24 can be flexed or deformed toward the belt 10 (downward). According to the cable tie 1 thus constructed, in the condition in which the belt 10 is tightened, the crossing angle A may be formed between the engagement surface 28 of the engagement claw 26 and the tooth surface 13 of one of the rack teeth 12. Therefore, when the belt extraction load is applied to the belt 10 in the fastened condition of the belt 10, the engagement strip 24 can be flexed or deformed toward the belt 10 while the crossing angle A is reduced or narrowed. Thus, the belt extraction load can be effectively absorbed.

Further, as shown in FIG. 6, when a large external force or substantial belt extraction load F substantially equal to a predicted (maximum) value is applied to the belt 10 in the fastened condition of the belt 10, the engagement strip 24 can be highly flexed or deformed toward the belt 10. As a result, the crossing angle A can be reduced to zero, so that the engagement surface 28 of the engagement claw 26 may fully contact the tooth surface 13 of one of the rack teeth 12 (FIG. 7) to form a surface contact therebetween. That is, even when the substantial belt extraction load F is applied to the belt 10, the engagement surface 28 of the engagement claw 26 can be prevented from being inclined with respect to the tooth surface 13 of one of the rack teeth 12. Thus, the substantial belt extraction load F can be effectively received or absorbed by the engagement surface 28 of the engagement claw 26, so that the engagement claw 26 may be effectively prevented from being disengaged from the rack teeth 12 of the belt 10. As a result, the belt 10 may be effectively prevented from being withdrawn or extracted from the through hole 22 of the buckle 20. That is, the cable tie 1 may have an excellent resistive power against the substantial belt extraction load F.

As described above, in the condition in which the belt 10 is tightened, in anticipation that the engagement strip 24 may be considerably flexed or deformed toward the belt 10 (downward) when the substantial belt extraction load F is applied to the belt 10, the engagement strip 24 may be previously deformed in an opposite direction (upward) such that the crossing angle A may be formed between the engagement surface 28 of the engagement claw 26 and the tooth surface 13 of one of the rack teeth 12 (FIGS. 4 and 5). Therefore, when the substantial belt extraction load F is applied to the belt 10 in the fastened condition of the belt 10, the crossing angle A can be reduced to zero, so that the engagement surface 28 of the engagement claw 26 may fully contact the tooth surface 13 of one of the rack teeth 12 (FIG. 7) to form the surface contact therebetween. As a result, the substantial belt extraction load F can be effectively received or absorbed by the engagement surface 28 of the engagement claw 26.

Further, the crossing angle A may be increased in view of the fact that the substantial belt extraction load F greater than the predicted value may be applied to the belt 10. In order to increase the crossing angle A, a ratio of the height of the engagement claw 26 to the height of each of the rack teeth 12 (the depth of each of the tooth spaces 15) may be further increased such that the engagement strip 24 may be further widely spaced from the rack teeth 12 upward in the condition in which the belt 10 is tightened. In such a structure, when the substantial belt extraction load F equal to the predicted value or less is applied to the belt 10 in the fastened condition of the belt 10, the engagement strip 24 can be flexed or deformed toward the belt 10 while the (increased) crossing angle A is reduced or narrowed. Thus, the substantial belt extraction load F can be absorbed. Conversely, when the substantial belt extraction load F greater than the predicted value is applied to the belt 10 in the fastened condition of the belt 10, the (increased) crossing angle A can be reduced to zero, so that the engagement surface 28 of the engagement claw 26 may fully contact the tooth surface 13 of one of the rack teeth 12 to form the surface contact therebetween. Thus, the substantial belt extraction load F greater than the predicted value can be effectively received or absorbed by the engagement surface 28 of the engagement claw 26. As a result, the engagement claw 26 may be effectively prevented from being disengaged from the rack teeth 12 of the belt 10, so that the belt 10 may be effectively prevented from being withdrawn or extracted from the through hole 22 of the buckle 20.

As described above, in this embodiment, in order to form the crossing angle A between the engagement surface 28 of the engagement claw 26 and the tooth surface 13 of one of the rack teeth 12 in the fastened condition of the belt 10, the engagement strip 24 may be formed so as to be flexed or deformed in the direction in which the engagement strip 24 may be spaced from the rack teeth 12 (upward) when the belt 10 is in the fastened condition. In particular, the engagement claw 26 may be formed such that the height of the engagement claw 26 may be greater than the height of each of the rack teeth 12 (the depth of each of the tooth spaces 15). Thus, the crossing angle A may be formed by simply inclining the engagement surface 28 of the engagement claw 26 relative to the tooth surface 13 of one of the rack teeth 12, i.e., by forming a (relative) inclination angle therebetween. That is, the crossing angle A may be formed without changing an (absolute) angle of the engagement surface 28 of the engagement claw 26 with respect to the lower surface 24b of the engagement strip 24. Thus, the engagement strip 24 may be formed such that the engagement surface 28 of the engagement claw 26 may substantially be perpendicular to the lower surface 24b of the engagement strip 24. Therefore, there is no need to specially design the molding die with a draft angle and/or an undercut shape in order to manufacture the cable tie 1.

Further, when the belt 10 may be inserted into the through hole 22 of the buckle 20 and tightened, the engagement strip 24 may be flexed or deformed in the direction in which the engagement strip 24 may be spaced from the rack teeth 12 (upward). Therefore, an insertion resistance of the belt 10 may be relatively reduced. As a result, a tightening force of the belt 10 can be reduced. Further, abrasion of the rack teeth 12 and the engagement claw 26 caused by friction therebetween can be minimized.

Figure 7:
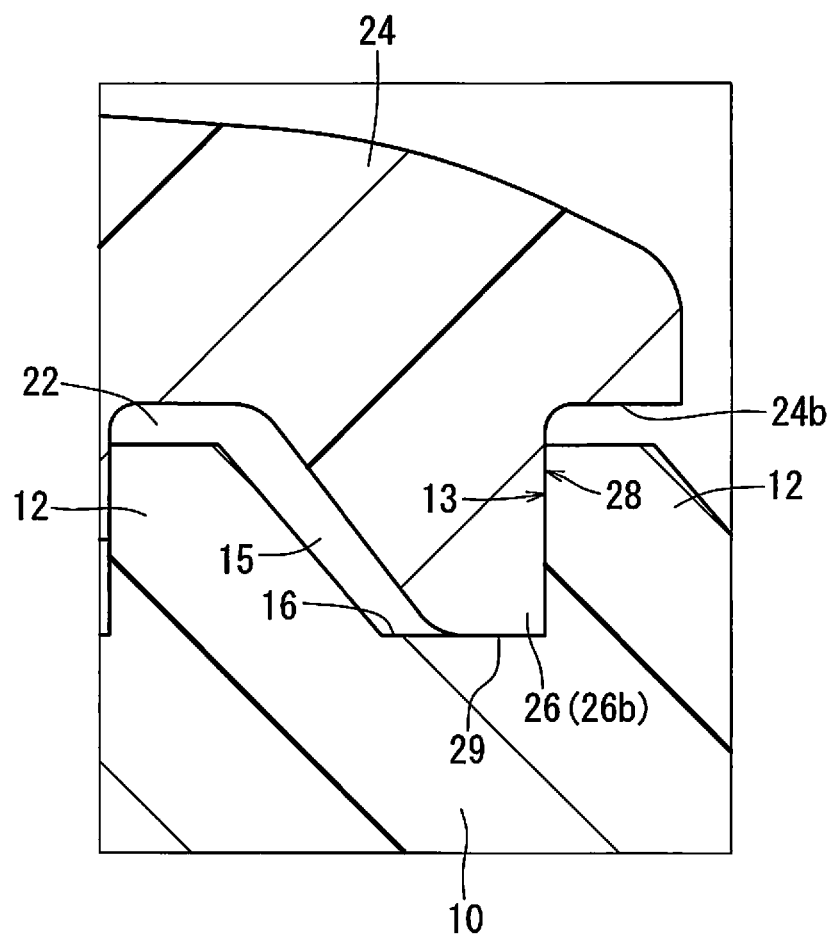
FIG. 7 is a partially enlarged view of FIG. 6.

As previously described, in this embodiment, as shown in FIG. 5, in the condition in which the belt 10 is tightened, the distal end surface 29 of the engagement claw 26 may partially contact the bottom surface 16 of one of the tooth spaces 15 of the rack teeth 12, so that the engagement strip 24 may be flexed or deformed in the direction in which the engagement strip 24 may be spaced from the rack teeth 12 (upward). Thus, the crossing angle A may be formed between the engagement surface 28 of the engagement claw 26 and the tooth surface 13 of one of the rack teeth 12. At this time, as shown in FIG. 5, a triangular clearance may be formed between the distal end surface 29 of the engagement claw 26 and the bottom surface 16 of one of the tooth spaces 15 of the rack teeth 12 (FIG. 5). That is, a substantial portion of the distal end surface 29 of the engagement claw 26 may be spaced from the bottom surface 16 of one of the tooth spaces 15 of the rack teeth 12. As a result, an engagement area of the engagement surface 28 of the engagement claw 26 with respect to the tooth surface 13 of one of the rack teeth 12 may be reduced. Further, because the triangular clearance may be closed due to flexure or deformation of the engagement strip 24 when the substantial belt extraction load F is applied to the belt 10 in the fastened condition of the belt 10, the engagement surface 28 of the engagement claw 26 may fully contact the tooth surface 13 of one of the rack teeth 12 so as to have a sufficient engagement area (FIG. 7). However, even in the clamped condition of the wiring harness W before the substantial belt extraction load F is applied to the belt 10, the engagement surface 28 of the engagement claw 26 should have the sufficient engagement area with respect to the tooth surface 13 of one of the rack teeth 12.

Figure 8:
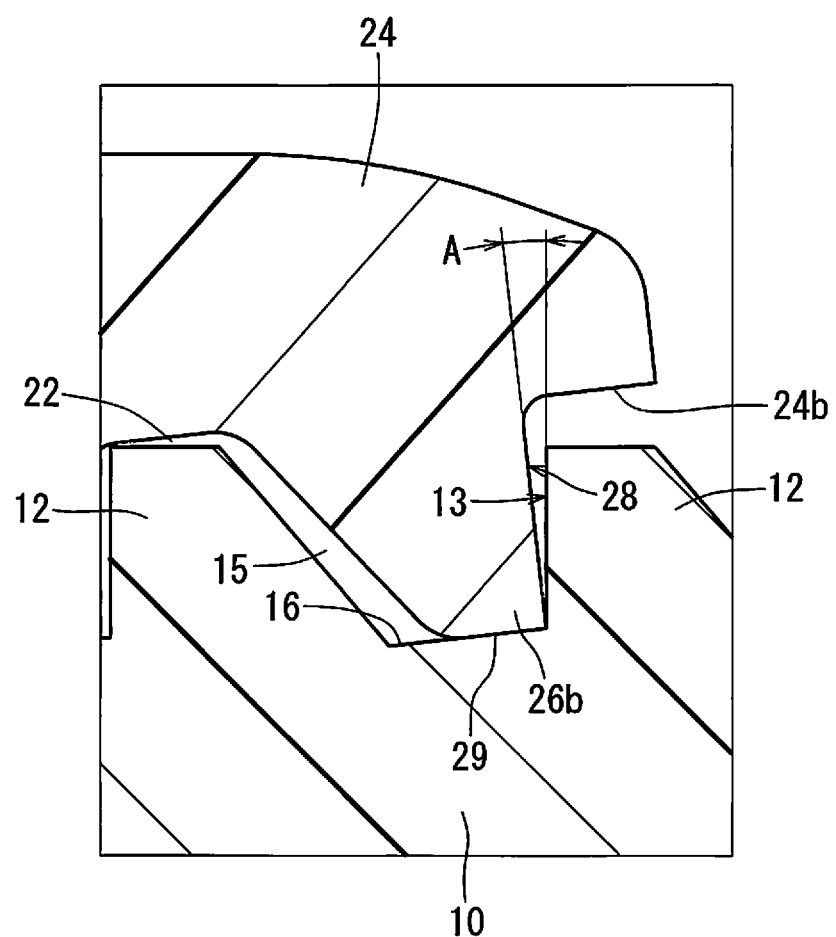
FIG. 8 is a view similar to FIG. 5, which illustrates a modified form of the cable tie.

A modified form of the representative embodiment will now be described with reference to FIG. 8. As shown in FIG. 8, in the modified form, the bottom surface 16 of one of the tooth spaces 15 of the rack teeth 12 may be inclined at a given angle such that the distal end surface 29 of the engagement claw 26 may entirely or fully contact the bottom surface 16 of one of the tooth spaces 15 of the rack teeth 12 without any clearance therebetween. In other words, each of the tooth spaces 15 may be configured such that the bottom surface 16 thereof may form an obtuse angle with respect to the tooth surface 13 of each of the rack teeth 12. According to the modified form, even in the clamped condition of the wiring harness W before the substantial belt extraction load F is applied to the belt 10, the engagement surface 28 of the engagement claw 26 may have the sufficient engagement area with respect to the tooth surface 13 of one of the rack teeth 12 while the engagement claw 26 may be prevented from being reduced or lowered in shear strength. Further, in order to manufacture the cable tie 1 thus modified, there is no need to specially design the molding die.

Further, instead of inclining the bottom surface 16 of one of the tooth spaces 15 of the rack teeth 12, the distal end surface 29 of the engagement claw 26 may be inclined at a given angle such that the distal end surface 29 of the engagement claw 26 may entirely contact the bottom surface 16 of one of the tooth spaces 15 of the rack teeth 12 without any clearance therebetween. In other words, the engagement claw 26 may be configured such that an acute angle may be formed between the engagement surface 28 and the distal end surface 29 of the engagement claw 26. According to such a structure, in the clamped condition of the wiring harness W before the substantial belt extraction load F is applied to the belt 10, the engagement surface 28 of the engagement claw 26 may have the sufficient engagement area with respect to the tooth surface 13 of one of the rack teeth 12 although the engagement claw 26 may be slightly reduced or lowered in shear strength.

Naturally, various changes and modifications may be made to the present invention without departing from the scope of the invention. For example, in the embodiment, as shown in FIGS. 5 and 8, in order to incline the engagement surface 28 of the engagement claw 26 with respect to the tooth surface 13 of one of the rack teeth 12 in the fastened condition in which the belt 10 is tightened (i.e., in the clamped condition of the wiring harness W), the engagement strip 24 may be configured such that the distal end surface 29 of the engagement claw 26 may contact the bottom surface 16 of one of the tooth spaces 15 of the rack teeth 12. However, in order to incline the engagement surface 28 of the engagement claw 26 with respect to the tooth surface 13 of one of the rack teeth 12 in the fastened condition of the belt 10, the engagement strip 24 may be configured such that the lower surface 24b thereof may contact a top surface of one of the rack teeth 12.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A cable tie having a desired length of flexible belt and a buckle connected to one longitudinal end of the belt, and configured to clamp a clamped article by inserting the other longitudinal end of the belt into a through hole of the buckle and tightening the belt in loop shape, the cable tie comprising:

rack teeth that are formed in one surface of the belt and are arranged in a longitudinal direction of the belt, an engagement strip that is positioned in the through hole of the buckle and is configured to be deformed about its proximal end connected to an inner wall of the buckle, and an engagement claw that is formed in the engagement strip in order to engage the rack teeth of the belt inserted into the through holeof the buckle, wherein the engagement claw has an engagement surface that faces a tooth surface of one of the rack teeth in a condition in which the engagement claw engages one of the rack teeth upon insertion of the belt into the through hole of the buckle, and wherein the engagement strip is configured to be deformed due to contact of the engagement claw with a bottom surface of one of tooth spaces of the rack teeth of the belt inserted into the through hole of the buckle, so that a crossing angle is formed between the engagement surface of the engagement claw and the tooth surface of one of the rack teeth in fastened condition in which the belt is inserted into the through hole of the buckle and is tightened.

2. The cable tie as defined in claim 1, wherein the engagement claw has a height greater than a height of each of the rack teeth, so that the engagement claw contacts the bottom surface of one of the tooth spaces of the rack teeth.

3. The cable tie as defined in claim 2, wherein the engagement claw contacts the bottom surface of one of tooth spaces of the rack teeth without any clearance therebetween.

4. The cable tie as defined in claim 1, wherein the bottom surface of each of tooth spaces is substantially perpendicular to the tooth surfaces of each of the rack teeth.

\* \* \* \* \*